United States Patent Office 2,929,814
Patented Mar. 22, 1960

2,929,814

3,20 DIKETALS DERIVATIVES OF 9α-HALO 16-HYDROXY-HYDROCORTISONE AND CORTISONE

Josef Fried and Gordon H. Thomas, New Brunswick, N.J., assignors to Olin Mathieson Chemical Corporation, New York, N.Y., a corporation of Virginia No Drawing. Application June 6, 1957
Serial No. 663,913

13 Claims. (Cl. 260—239.55)

This invention relates to the synthesis of steroids and has for its objects: (1) the provision of an advantageous process of preparing physiologically-active steroids of the 9α-halo-16α-hydroxy pregnene series; and (2) the provision of certain new steroids useful either for their own physiological action or as intermediates in said process.

The process of this invention essentially comprises: (a) treating a 3,20-diketalized 9α-halo-Δ¹⁶-steroid of the pregnadiene series with osmium tetroxide, and (b) deketalizing the 16α,17α-dihydroxy steroid thus formed.

The novel compounds of this invention may be represented by the general formula

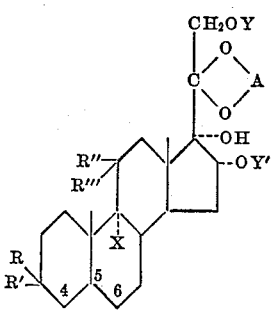

wherein one of the positions 4,5 and 5,6 is double-bonded, A is a divalent organic radical, such as lower alkylene (e.g. ethylene, propylene-1,2 and propylene-1,3), R and R' together are either keto or —O—A—O—, wherein A is as hereinbefore defined, R" is hydrogen, R''' is β-hydroxy or together R" and R''' is keto, X is halogen, and Y and Y' are hydrogen or an acyl radical, especially the acyl radical of a hydrocarbon carboxylic acid having less than ten carbon atoms, as exemplified by the acyl radicals of the lower alkanoic acids (e.g. acetic, propionic and butyric acid), the monocyclic aryl carboxylic acids (e.g. benzoic and toluic acid); the monocyclic aryl lower alkanoic acids (e.g. phenacetic and β-phenylpropionic acid), the lower alkenoic acids, the cycloalkanecarboxylic acids and the cycloalkenecarboxylic acids.

The compounds of this invention are utilizable as intermediates in the preparation of the corresponding 3,20-diketo derivatives (e.g. the 9α-halo-16α-hydroxyhydrocortisones, the 9α-halo-16α-hydroxycortisones and esters thereof), which are disclosed in the application of Josef Fried, Serial No. 646,969, filed March 19, 1957, (and in the literature cited therein) as being physiologically active steroids.

The first step in the process of this invention can be represented by the following equation:

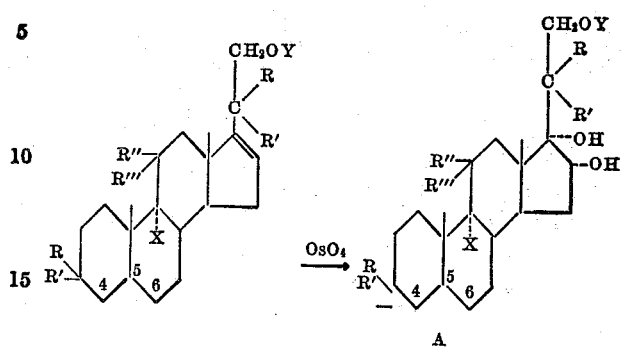

| | | |
|---|---|---|
| I | R+R'=—OCH$_2$CH$_2$O—; R"+R'''=O=; X=F; Y=CH$_3$CO—; 5,6-double-bonded | IX |
| II | R+R'=—OCH$_2$CH$_2$O—; R"+R'''=O—; X=Cl; Y=CH$_3$CO—; 5,6-double-bonded | X |
| III | R+R'=O=; R"+R'''=O=; X=F; Y=H; 4,5-double-bonded | XI |
| IV | R+R'=O=; R"+R'''=O=; X=Cl; Y=H; 4,5-double-bonded | XII |
| V | R+R'=O=; R"=H; R'''=β—OH; X=F; Y=H; 4,5-double-bonded | XIII |
| VI | R+R'=O=; R"=H; R'''=β—OH; X=Cl; Y=H; 4,5-double-bonded | XIV |
| VII | R+R'=—OCH$_2$CH$_2$O—; R"=H; R'''=β—OH; X=F; Y=CH$_3$CO—; 5,6-double-bonded | XV |
| VIII | R+R"=—OCH$_2$CH$_2$O—; R"=H; R'''=β—OH; X=Cl; Y=CH$_3$CO—; 5,6-double-bonded | XVI |

This reaction is achieved by means of osmium tetroxide which introduces hydroxyl groups into both the 16 and 17 positions. The reaction is preferably conducted in an organic solvent for the steroid (e.g. benzene) in the presence of an organic base such a pyridine. The reaction readily takes place at room temperature although any other normal temperature may be employed.

The starting materials used in this reaction are disclosed in our application, Serial No. 663,597, filed June 5, 1957. Representative starting materials include the 9α-halo-Δ⁴,¹⁶-pregnadiene-21-ol-3,11,20-triones [e.g. 9α-fluoro-(or chloro)-Δ⁴,¹⁶-pregnadiene-21-ol-3,11,20-trione]; the 9α-halo-Δ⁴,¹⁶-pregnadiene-11β,21-diol-3,20-diones [e.g. 9α-fluoro (or chloro)-Δ⁴,¹⁶-pregnadiene-11β,21-diol-3,20-dione]; the 21-esters of 9α-halo-Δ⁵,¹⁶-pregnadiene-21-ol-3,11,20-trione 3,20-diketals [e.g. 9α-fluoro (or chloro)-Δ⁵,¹⁶-pregnadiene-21-ol-3,11,20-trione 21-acetate 3,20-bis-ethylene ketal]; and the 21-esters of 9α-halo - Δ⁵,¹⁶-pregnadiene-11β,21-diol-3,20-dione 3,20-diketals [e.g. 9α-fluoro (or chloro)-Δ⁵,¹⁶-pregnadiene-11β,21-diol -3,20-dione 21-acetate 3,20-bis-ethylene ketal].

The reaction results in a 16α,17α-dihydroxy derivative (Compounds A) containing in the 3,9,11,20 and 21 positions substituents corresponding to those in the starting material. Thus, if the steroid reactant contains free keto groups in the 3 and 20 positions, a physiologically-active 9α-halo-16α-hydroxyhydrocortisone (or cortisone) is formed directly. If, however, a ketal is employed as the reactant, the product formed also contains the ketal group and one of the new steroids of this invention is prepared. This ketal intermediate must then be converted to the free keto derivative as more fully described hereinafter and as represented by the following equations:

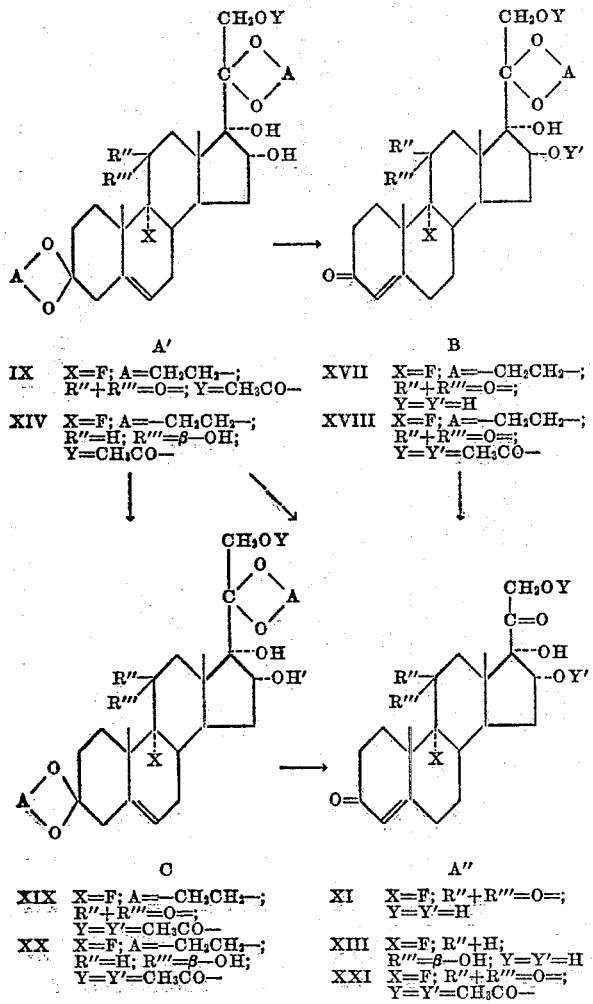

IX  X=F; A=CH₂CH₂—;
    R″+R‴=O=; Y=CH₃CO—

XIV X=F; A=—CH₂CH₂—;
    R″=H; R‴=β—OH;
    Y=CH₃CO—

XVII X=F; A=—CH₂CH₂—;
     R″+R‴=O=;
     Y=Y′=H

XVIII X=F; A=—CH₂CH₂—;
      R″+R‴=O=;
      Y=Y′=CH₃CO—

XIX X=F; A=—CH₂CH₂—;
    R″+R‴=O=;
    Y=Y′=CH₃CO—

XX  X=F; A=—CH₂CH₂—;
    R″=H; R‴=β—OH;
    Y=Y′=CH₃CO—

XI  X=F; R″+R‴=O=;
    Y=Y′=H

XIII X=F; R″+H;
     R‴=β—OH; Y=Y′=H

XXI X=F; R″+R‴=O=;
    Y=Y′=CH₃CO—

To prepare Compounds B, Compound A', diketalized in the 3,20-positions and esterified in the 21-position, is hydrolyzed as by heating with a dilute acid (e.g. dilute sulfuric acid), for less than two hours (e.g. for one and one half hours) the reaction preferably being carried out in an organic solvent (e.g. methanol) wherein the diketal is soluble. The reaction results in deketalization in the 3-position and saponification in the 21-position to yield the 20-monoketal derivative (Compounds B, Y and Y' being hydrogen). If the reaction is conducted for a period of more than two hours (e.g. three to five hours) then both ketal groups are hydrolyzed to yield the free 3,20-diketo derivative (Compounds A″, R+R′ being keto and Y and Y′ being hydrogen).

The Compounds A″ and B, thus formed, can then be acylated in the usual manner, as by treatment with an acyl halide or acid anhydride, especially an acyl halide or acid anhydride of a hydrocarbon carboxylic acid having less than ten carbon atoms (e.g. acetic anhydride). This reaction is preferably carried out in the presence of an organic base, such as pyridine. If only an equivalent of acylating agent is present per mol of steroid, a 21-monoacylated derivative is obtained. If, however, at least two equivalents of acylating agent are employed, a 16α, 21-diester is formed (e.g. Compounds B, Y and Y' being acyl radicals).

If Compounds A', diketalized and esterified in the 21-position, are reacted with an acylating agent as described above, a 16α-ester is produced (Compounds C, Y and Y' being acyl radicals).

If an attempt is made to reduce a compound of structure A', containing a keto group in the 11-position, by means of an alkali metal borohydride (e.g. sodium borohydride), the nature of the product will depend on the conditions thereon for the reaction. In most solvents the reaction proceeds to yield the expected 11β-hydroxy derivative (with concomitant hydrolysis of the ester group). To prepare a compound of the structure A″ having an 11β-hydroxyl group, free keto groups in the 3 and 20 positions and free hydroxyl groups in the 16α and 21 positions, it is preferred that the reduction of compounds of the structure A be effected by heating in a polar solvent (e.g. aqueous methanol), deketalization being subsequently effected by heating the reaction mixture after acidification with a dilute acid (e.g. dilute sulphuric acid). If, however, the reaction is conducted in tetrahydrofuran, a cycloborate ester is the initial product (see Example 5) which must then be hydrolized by treatment with aqueous alkali (e.g. sodium hydroxide) to yield the free 16α,17α-dihydroxy compound.

The following examples illustrate the invention (all temperature being in centigrade):

EXAMPLE 1

9α-fluoro-Δ⁵-pregnene-16α,17α,21-triol-3,11,20-trione 21-acetate 3,20-bis-ethylene ketal (IX)

To a solution of 9α-fluoro-Δ⁵,¹⁶-pregnadiene-21-ol-3,11-20-trione 21-acetate 3,20-bis-ethylene ketal (I) (1.28 g.) in benzene (25 ml.) and pyridine (1.2 ml.), is added osmium tetroxide (582 mg.). The solution is allowed to stand at room temperature for 18 hours, and is then stirred for 4 hours with water (68 ml.), benzene (25 ml.), methanol (46 ml.), sodium sulfite (7 g.) and potassium bicarbonate (7 g.). Chloroform (100 ml.) is added and the precipitate filtered off and washed with chloroform (100 ml.). The filtrate is washed twice with saline solution (2 x 20 ml.), dried over sodium sulfate, and evaporated to dryness in vacuo. Trituration of the residue with methanol yields the triol (about 1.1 g.) with melting point at about 262–265°. Crystallization from acetone-hexane affords an analytical sample at about 279–282°; [α]$_D$–16.8° (c. 1.10 in CHCl₃);

$\lambda_{max}^{Nujol}$ 2.90, 5.75, 5.86, 8.05μ

*Analysis.*—Calcd. for C₂₇H₃₇O₉F: C, 61.81; H, 7.11; F, 3.62. Found: C, 62,23; H, 7.13; F, 3.85.

Similarly, by substituting

9α-chloro-Δ⁵,¹⁶-pregnadiene-21-ol-3,11,20-trione 21-acetate 3,20-bis-ethylene ketal (II),
9α-fluoro-Δ⁴,¹⁶-pregnadiene-21-ol-3,11,20-trione (III),
9α-chloro-Δ⁴,¹⁶-pregnadiene-21-ol-3,11,20-trione (IV),
9α-fluoro-Δ⁴,¹⁶-pregnadiene-11β,21-diol-3,20-dione (V),
9α-chloro-Δ⁴,¹⁶-pregnadiene-11β,21-diol-3,20-dione (VI),
9α-fluoro-Δ⁵,¹⁶-pregnadiene-11β,21-diol - 3,20 - dione 21-acetate 3,20-bis-ethylene ketal (VII), and
9α-chloro-Δ⁵,¹⁶-pregnadiene-11β,21-diol - 3,20 - dione 21-acetate 3,20-bis-ethylene ketal (VIII)

for the 9α-fluoro-Δ⁵,¹⁶-pregnadiene 21-ol-3,11,20-trione 21-acetate 3,20-bis-ethylene ketal in the procedure of Example 1, there is obtained 9α-chloro-Δ⁵-pregnene-16α,17α,21-triol-3,11,20-trione 21-acetate 3,20-bis-ethylene ketal (X),
9α-fluoro-16α-hydroxycortisone (XI),
9α-chloro-16α-hydroxycortisone (XII),
9α-fluoro-16α-hydroxyhydrocortisone (XIII),
9α-chloro-16α-hydroxyhydrocortisone (XIV),
9α-fluoro-Δ⁵-pregnene-11β,16α,17α,21-tetrol - 3,20 - dione 21-acetate 3,20-bis-ethylene ketal (XV), and
9α-chloro-Δ⁵-pregnene-11β,16α,17α,21-tetrol - 3,20 - dione 21-acetate 3,20-bis-ethylene ketal (XVI), respectively.

EXAMPLE 2

9α-fluoro-Δ⁴-pregnene-16α,17α,21-triol-3,11,20-trione 20-ethylene ketal (XVII)

A solution of 9α fluoro-Δ⁵-pregnene-16α,17α,21-triol-3,11,20-trione 21-acetate 3,20-bis-ethylene ketal (IX) (60 mg.) in methanol (10 ml.) and 8% (v./v.) sulfuric acid (1 ml.) is heated under reflux for 40 minutes. The solution is diluted with water and the steroids extracted with chloroform. The extract is then washed once with water, dried over sodium sulfate and evaporated in vacuo. The crude triol 20-monoketal (about 57 mg.) has M.P. about 255–258°, $\lambda_{max}^{Nujol}$ 2.95, 5.81, 6.01, 6.17μ

EXAMPLE 3

9α-fluoro-Δ⁴-pregnene-16α,17α,21-triol-3,11,20-trione 16,21-diacetate 20-ethylene ketal (XVIII)

A solution of 9α-fluoro-Δ⁴-pregnene-16α,17α,21-triol-3,11,20-trione 20-ethylene ketal (XVII) in 2 ml. of pyridine and 0.7 ml. of acetic anhydride is left at room temperature for 18 hours. The solution is diluted with iced water and extracted with chloroform, the organic layer then being washed with water, dried over sodium sulfate and evaporated under reduced pressure. Crystallization from acetone-hexane gives the 20-ethylene ketal diacetate (about 41.7 mg.), melting at about 187–190°, [α]_D +62° (c. 0.53 in CHCl₃);

$\lambda_{max}^{alc.}$ 232 mμ (ε=17.700); $\lambda_{max}^{Nujol}$ 2.85, 5.68, 5.56, 5.80, 5.97, 6.16μ

This compound does not give the characteristic color reaction of an α-ketol with 2,3,5-triphenyl tetrazolium chloride.

Analysis.—Calc. for $C_{27}H_{35}O_9F$ (522.55): C, 62.08; H, 6.75; F, 3.64. Found: C, 62.62; H, 6.63; F, 3.75.

EXAMPLE 4

9α-fluoro-Δ⁵-pregnene-16α,17α,21-triol-3,11,20-trione 16α-21-diacetate 3,20-bis-ethylene ketal (XIX)

A solution of 9α-fluoro-Δ⁵-pregnene-16α,17α,21-triol-3,11,20-trione 21-acetate 3,20-bis-ethylene ketal (IX) (250 mg.) in pyridine (3 ml.) and acetic anhydride (1 ml.) is allowed to stand at room temperature for 18 hours. The mixture is then diluted with water, the precipitated solid (about 300 mg.) collected and washed with water. Crystallization from acetone-hexane gives the diacetate (about 25 mg.) melting at about 241–246°;

$\lambda_{max}^{Nujol}$ 2.80, 5.73, 5.81, 8.15μ

Similarly, 9α-fluoro-Δ⁵-pregnene-11β,16α,17α,21-tetrol-3,20-dione 21-acetate 3,20-bis-ethylene ketal (XIV) yields the 16,21-diacetate (XX).

EXAMPLE 5

9α-fluoro-Δ⁵-pregnene-11β,16α,17α,21-tetrol-3,20-dione 3,20-bis-ethylene ketal 16α,17α-cycloborate ester A mixture of 9α-fluoro-Δ⁵-pregnene-16α,17α,21-triol-3,11,20-trione 21-acetate 3,20-bis-ethylene ketal (IX) (200 mg.) and sodium borohydride (200 mg.) in tetrahydrofuran (2.5 ml.) and water (0.2 ml.) is stirred for 18 hours at room temperature. The solution is then diluted with water (10 ml.) and acidified to pH 6 by the addition of 8% sulfuric acid solution. The precipitate (about 166 mg.) is collected, washed with water and dried in vacuo over phosphorus pentoxide. Crystallization from acetone give the borate ester (about 110 mg.) with melting point greater than 300°;

$\lambda_{max}^{Nujol}$ 2.94μ

Analysis.—Calcd. for $C_{25}H_{36}O_9BF$ (510.36): F, 3.72. Found: F, 3.28.

Neutralization equivalent: 612.

The compound has the structural formula

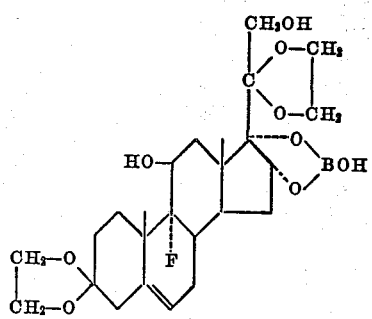

EXAMPLE 6

9α-fluoro-Δ⁵-pregnene-11β,16α,17α,21-tetrol-3,20-dione 3,20-bis-ethylene ketal A stirred solution of 9α-fluoro-Δ⁵-pregnene-11β,16α,17α,21-tetrol-3,20-dione 3,20-bis-ethylene ketal 16α,17α-cycloborate ester (40 mg.) in 2N aqueous sodium hydroxide (6 ml.) and benzene (10 ml.) is refluxed under nitrogen for 3 hours. The solution is then diluted with 50 ml. of water, the aqueous layer then being separated and extracted with benzene (2 x 20 ml.). The benzene extracts are washed once with water, dried over sodium sulfate and evaporated to dryness in vacuo, leaving a residue of 9α-fluoro-Δ⁵-pregnene-11β,16α,17α,21-tetrol-3,20-dione 3,20-bis-ethylene ketal.

EXAMPLE 7

9α-fluoro-Δ⁵-pregnene-11β,16α,17α,21-tetrol-3,20-dione 3,20-bis-ethylene ketal 16α,21-diacetate Following the procedure of Example 4 but substituting 9α-fluoro-Δ⁵-pregnene-11β,16α,17α,21-tetrol-3,20-dione 3,20-bis-ethylene ketal for the 9α-fluoro-Δ⁵-pregnene-16α,17α,21-triol-3,11,20-trione 21-acetate 3,20-bis-ethylene ketal, there is obtained 9α-fluoro-Δ⁵-pregnene-11β,16α,17α,21-tetrol-3,20-dione 3,20-bis-ethylene ketal 16α,21-diacetate.

EXAMPLE 8

9α-fluoro-Δ⁴-pregnene-11β,16α,17α,21-tetrol-3,20-dione (XIII)

A solution of 9α-fluoro-Δ⁵-pregnene-16α,17α,21-triol-3,11,20-trione 21-acetate 3,20-bis-ethylene ketal (IX) (100 mg.) and sodium borohydride (100 mg.) in methanol (10 ml. and water (2 ml.) is refluxed for 18 hours. The mixture is diluted with water (30 ml.) and extracted with chloroform, the organic layer then being washed once with water, dried over sodium sulfate and evaporated to dryness in vacuo. The residue is taken up in methanol (5 ml.) and 8% aqueous sulfuric acid (0.5 ml.) and the solution refluxed for one hour. Water is added and the solution is extracted with chloroform. Evaporation of the chloroform in vacuo followed by crystallization of the residue from 95% ethanol yields the tetrol (about 20 mg.) melting at about 208–215°. Recrystallization from 95% alcohol affords a pure sample melting at about 250° and having an infrared spectrum identical with that of an authentic specimen.

EXAMPLE 9

9α-fluoro-Δ⁴-pregnene-16α,17α,21-triol-3,11,20-trione (XI)

A solution of 9α-fluoro-Δ⁵-pregnene-16α,17α,21-triol-3,11,20-trione 21-acetate 3,20-bis-ethylene ketal (IX) (100 mg.) in methanol (10 ml.) and 8% sulfuric acid (1 ml.) is refluxed for 3½ hours. The mixture is diluted with water and extracted with chloroform, the organic layer then being washed once with water, dried over sodium sulfate and evaporated to dryness in vacuo. The residue (M.P. about 220–231°) consists of the 16α,17α,21-triol.

EXAMPLE 10

*9α-fluoro-Δ⁴-pregnene-16α,17α,21-triol-3,11,20-trione 16α,21-diacetate (XXI)*

9α - fluoro - Δ⁴ - pregnene - 16α,17α,21 - triol - 3,11,20-trione (XI) (80 mg.) is dissolved in pyridine (3 ml.) and acetic anhydride (1 ml.) and allowed to stand at room temperature for 18 hours. Iced water is added to the reaction mixture and the steroids are extracted with chloroform. The chloroform extracts are then washed with water, dried over sodium sulfate and the solvent removed in vacuo. The residue (about 70 mg.) on crystallization from acetone-hexane gives a pure sample of diacetate melting at about 224–227°, $\lambda^{Nujol}_{max}$ 2.95, 5.72, 5.76, 5.80, 6.00, 6.20, 8.06μ; $\lambda^{alc}_{max}$ 234 mμ ($\epsilon = 15,000$);

$[\alpha]_D^{23} + 94°$ (c. 0.35 in CHCl₃).

*Analysis.*—Calcd. for $C_{25}H_{31}O_8F$ (478.49): C, 62.75; H, 6.53. Found: C, 63.03; H, 6.53.

The invention may be otherwise variously embodied within the scope of the appended claims.

What is claimed is:

1. A steroid selected from the group consisting of the 20-monoketals and 3,20-diketals of a steroid of the general formula

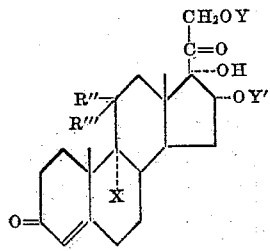

wherein R'' is hydrogen, R''' is β-hydroxy and together R'' and R''' is keto, X is selected from the group consisting of chlorine and fluorine, and Y and Y' are each selected from the group consisting of hydrogen and the acyl radical of a hydrocarbon carboxylic acid having less than ten carbon atoms.

2. A compound selected from the group consisting of the 21-monoester and 16α,21-diester of 9α-halo-Δ⁵-pregnene-16α,17α,21-triol-3,11,20-trione 3,20-diketal and a hydrocarbon carboxylic acid having less than ten carbon atoms, wherein the halo radical is selected from the group consisting of chloro and fluoro.

3. The 21-ester of 9α-halo-Δ⁵-pregnene-16α,17α,21-triol-3,11,20-trione 3,20-diketal and a hydrocarbon carboxylic acid having less than ten carbon atoms, wherein the halo radical is selected from the group consisting of chloro and fluoro.

4. 9α - fluoro - Δ⁵ - pregnene - 16α,17α,21 - triol - 3,11,20-trione 21-acetate 3,20-bis-ethylene ketal.

5. 9α - halo - Δ⁵ - pregnene - 11β,16α,17α,21 - tetrol-3,20-dione 3,20-diketal, wherein the halo radical is selected from the group consisting of chloro and fluoro.

6. 9α - fluoro - Δ⁵ - pregnene - 11β,16α,17α,21 - tetrol-3,20-dione 3,20-bis-ethylene ketal.

7. 9α - halo - Δ⁴ - pregnene - 16α,17α,21 - triol - 3,11,20-trione 20-ketal, wherein the halo radical is selected from the group consisting of chloro and fluoro.

8. 9α - fluoro - Δ⁴ - pregnene - 16α,17α,21 - triol - 3,11,20-trione 20-ethylene ketal.

9. 9α - fluoro - Δ⁵ - pregnene - 11β,16α,17α,21 - tetrol-3,20-dione 3,20-bis-ethylene ketal 16α,17α-cycloborate ester.

10. A compound selected from the group consisting of the 21-monoester and 16α,21-diester of 9α-halo-Δ⁴-pregnene-16α,17α,21-triol-3,11,20-trione 20-ketal and a hydrocarbon carboxylic acid having less than ten carbon atoms, wherein the halo radical is selected from the group consisting of chloro and fluoro.

11. 9α - fluoro - Δ⁴ - pregnene - 16α, 17α,21 - triol-3,11,20-trione 16α,21-diacetate 20-ethylene ketal.

12. In the process for preparing a compound selected from the group consisting of steroids of the formulae

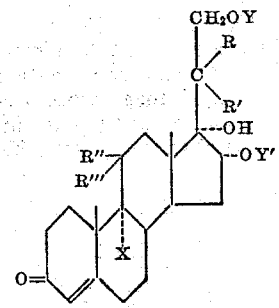

and

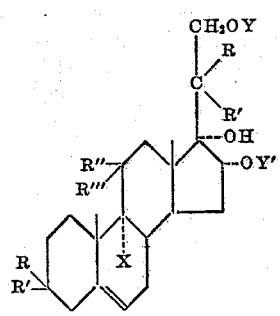

wherein R and R' together are selected from the group consisting of keto and —O—A—O—, wherein A is a divalent organic radial, R'' is hydrogen, R''' is β-hydroxy, and together R'' and R''' is keto, X is selected from the group consisting of chlorine and fluorine, and Y is selected from the group consisting of hydrogen and the acyl radical of a hydrocarbon carboxylic acid having less than ten carbon atoms, the step which comprises interacting a compound selected from the group consisting of steroids of the formulae

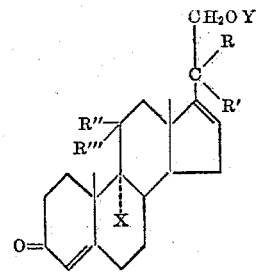

and

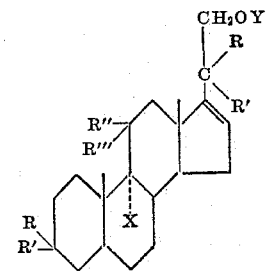

wherein R, R', R'', R''', X and Y are as above-defined, with osmium tetroxide.

13. The process of claim 12 wherein the steroid reactant is 9α-fluoro-Δ⁵,¹⁶-pregnadiene-21-ol-3,11,20-trione 21-acetate 3,20-bis-ethylene ketal.

No references cited.

UNITED STATES PATENT OFFICE
Certificate of Correction

Patent No. 2,929,814                                           March 22, 1960

Josef Fried et al.

It is hereby certified that error appears in the printed specification of the above numbered patent requiring correction and that the said Letters Patent should read as corrected below.

Column 2, lines 5 to 17, the right-hand formula should appear as shown below instead of as in the patent:

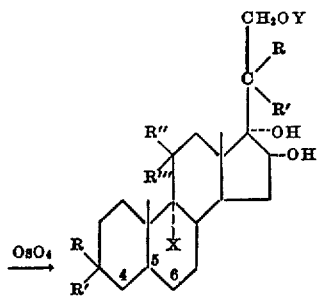

column 3, lines 25 to 38, the left-hand formula should appear as shown below instead of as in the patent:

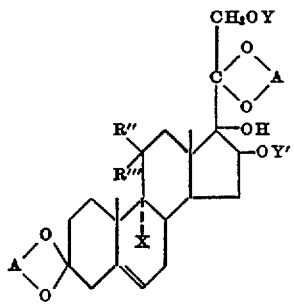

column 4, line 47, for "62,23" read —62.23—; column 5, line 30, for "5.56" read —5.76—; line 35, for "62,08" read —62.08—.

Signed and sealed this 18th day of October 1960.

[SEAL]

Attest:
KARL H. AXLINE,
*Attesting Officer.*

ROBERT C. WATSON,
*Commissioner of Patents.*